(12) United States Patent
Her et al.

(10) Patent No.: US 10,732,777 B2
(45) Date of Patent: Aug. 4, 2020

(54) SYSTEM AND METHOD FOR INTERFERENCE MITIGATION IN A SENSING DEVICE

(71) Applicant: SYNAPTICS INCORPORATED, San Jose, CA (US)

(72) Inventors: June Her, San Jose, CA (US); Albert Y. Lee, Sunnyvale, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 13 days.

(21) Appl. No.: 16/014,830

(22) Filed: Jun. 21, 2018

(65) Prior Publication Data

US 2018/0373361 A1 Dec. 27, 2018

Related U.S. Application Data (60) Provisional application No. 62/523,530, filed on Jun. 22, 2017.

(51) Int. Cl.
*G06F 3/044* (2006.01)
*G06F 3/041* (2006.01)
*G06F 3/042* (2006.01)
*G06K 9/00* (2006.01)
*G06K 9/20* (2006.01)

(52) U.S. Cl.
CPC .............. *G06F 3/044* (2013.01); *G06F 3/042* (2013.01); *G06F 3/0418* (2013.01); *G06K 9/0004* (2013.01); *G06K 9/2027* (2013.01); *G06F 3/0412* (2013.01)

(58) Field of Classification Search
CPC ...... G06F 3/044; G06F 3/0418; G06F 3/0412; G06F 3/042
See application file for complete search history.

(56) References Cited

U.S. PATENT DOCUMENTS

| | | | |
|---|---|---|---|
| 9,921,668 B1 * | 3/2018 | Chadda | G06F 3/041 |
| 2002/0089491 A1 | 7/2002 | Willig | |
| 2011/0084857 A1 * | 4/2011 | Marino | G06F 3/044 |
| | | | 341/5 |
| 2011/0210941 A1 * | 9/2011 | Reynolds | G06F 3/0418 |
| | | | 345/174 |
| 2012/0056834 A1 * | 3/2012 | Kim | G06F 3/0418 |
| | | | 345/173 |
| 2012/0249476 A1 | 10/2012 | Schwartz et al. | |
| 2012/0262390 A1 * | 10/2012 | Kida | G06F 3/0412 |
| | | | 345/173 |
| 2013/0050144 A1 | 2/2013 | Reynolds | |
| 2014/0062937 A1 | 3/2014 | Schwartz et al. | |
| 2015/0084908 A1 | 3/2015 | Jordan | |
| 2015/0091864 A1 | 4/2015 | Reynolds | |
| 2015/0103024 A1 * | 4/2015 | Haga | G06F 3/016 |
| | | | 345/173 |

(Continued)

*Primary Examiner* — Sejoon Ahn
(74) *Attorney, Agent, or Firm* — Patterson + Sheridan, LLP (57) ABSTRACT

A controller for a sensor is configured to receive a control signal from an external device, the control signal corresponding to potential interference. The controller adjusts a sensing parameter using the control signal to avoid the potential interference. The potential interference is at least one of an electrical interference and an optical interference. The controller may include a sensor module that includes circuitry configured to acquire resulting signals with sensing elements using the adjusted sensing parameter.

20 Claims, 8 Drawing Sheets

(56) References Cited

U.S. PATENT DOCUMENTS

2015/0309612 A1 10/2015 Morein et al.
2016/0132115 A1* 5/2016 Haga ................ G06F 3/016
              345/173
2017/0344787 A1* 11/2017 Cho ................ G06F 3/0416

* cited by examiner

SYSTEM AND METHOD FOR INTERFERENCE MITIGATION IN A SENSING DEVICE

CROSS-REFERENCE TO RELATED APPLICATIONS

This application claims benefit of U.S. provisional patent application Ser. No. 62/523,530, filed Jun. 22, 2017, entitled "SYSTEM AND METHOD FOR INTERFERENCE AVOIDANCE IN A FINGERPRINT SENSOR", which is herein incorporated by reference in its entirety.

TECHNICAL FIELD

Embodiments of disclosure generally relate to electronic devices and, more particularly, to the avoidance interference in a sensing device.

BACKGROUND

Fingerprint sensors are commonly used to authenticate users and are frequently found in electronic devices (systems) such as mobile phones, tablets, personal computers, etc. Fingerprint sensors typically comprise, for example, a controller coupled to a plurality of sensing elements utilized to acquire an image of a fingerprint. The fingerprint image may then be utilized to authenticate a user with an electronic device.

In many implementations, fingerprint sensors are disposed within a border region of an electronic device. However, in response to device manufacturers minimizing the border regions to allow for larger displays, the location of the fingerprint sensors needs to be changed. For example, fingerprint sensors may be located below a display area of a display device or integrated within the display device. However, locating the fingerprint sensor below or integrating the fingerprint sensor within the display device exposes the fingerprint sensor to increased interference from the display device and other electronic components in the electronic device (e.g., position sensing devices, communication devices, etc.). Thus, there is a need to minimize interference that may affect the operation of fingerprint sensors especially when the fingerprint sensors are located below or integrated within a display device.

SUMMARY

In one embodiment, a sensor controller configured to receive a control signal corresponding to potential interference comprises sensor circuitry configured to acquire resulting signals based at least in part on a sensing parameter and a sensing parameter adjuster configured to adjust the sensing parameter based at least in part on the control signal to avoid the potential interference.

In one embodiment, a method for avoiding potential interference in a sensor comprises receiving, at an input of the sensor, a control signal corresponding to the potential interference, adjusting a sensing parameter of the sensor based at least in part on the control signal to avoid the potential interference, and acquiring resulting signals with one or more sensing elements based at least in part on the adjusted sensing parameter.

In one embodiment, an input device comprises a plurality of sensing elements, and a sensor controller coupled to the plurality of sensing elements. The sensor controller comprises a first input and a sensing parameter. The sensor controller is configured to receive, at the first input, a control signal corresponding to potential interference, adjust the sensing parameter based at least in part on the control signal, and acquire resulting signals with one or more sensing elements.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation. The drawings should not be understood as being drawn to scale unless specifically noted. Also, the drawings may be simplified and details or components omitted for clarity of presentation and explanation. The drawings and discussion serve to explain principles discussed below, where like designations denote like elements.

DETAILED DESCRIPTION

Embodiments disclosed herein describe techniques to avoid or mitigate effects caused by potential interference to the operations of a sensor in an electronic device. For example, operations of a sensor (e.g., a fingerprint sensor, a biometric sensor) may be synchronized to other components in an electronic device by using a control signal. In various embodiments, a sensor controller may receive a control signal via an input, adjusts one or more sensing parameters using the received control signal, and use the adjusted sensing parameter(s) to operate the sensor.

The sensors may be fingerprint sensors, biometric sensors, capacitive sensors, optical sensors, ultrasonic sensors, or any suitable type of sensors. In this disclosure, fingerprint sensors will be used in illustrative embodiments. The sensor and the sensor controller may be separate components or may be an integrated unit. The control signal may be provided by a device external to the sensor, such as a display device, a sensing device, and/or a host device. In various embodiments, the control signal may be provided by a controller of the device external to the sensor, for example, a controller of a display device, a controller of a sensing device, and/or a controller of a host device. The sensing device may be a touch sensing device, an infrared (IR) sensing device, a microphone, an accelerometer, and the like. Embodiments described herein enable avoidance and/or mitigation of undesirable effects caused by potential interference.

Figure 1:
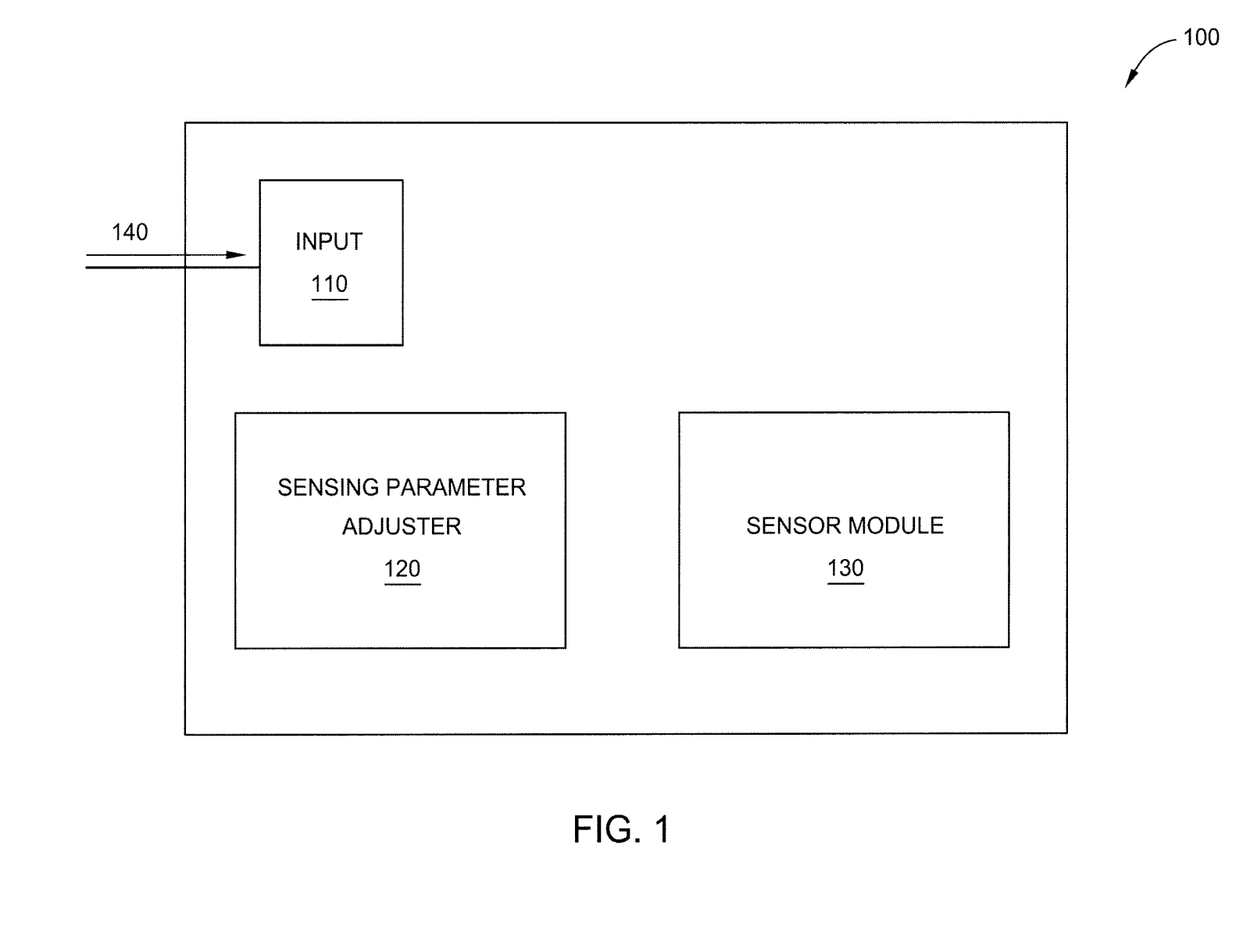
FIG. 1 illustrates a fingerprint controller according to one or more embodiments.

Referring to FIG. 1, one embodiment of a sensor controller 100 of a sensor is shown (e.g., fingerprint controller 100). Fingerprint controller 100 comprises an input 110 configured to receive a control signal 140 corresponding to potential interference. In one or more embodiments, the control signal 140 may be received from one or more devices external to fingerprint controller 100. For example, control signal 140 may include the combination of potential interference from two or more devices external to the sensor. Further, in various embodiments, two or more devices external to the sensor may be configured to provide different control signals at different, non-overlapping, times. Fingerprint controller 100 further comprises a sensing parameter adjuster 120 configured to adjust one or more sensing parameters based at least in part on the control signal 140. Fingerprint controller 100 also comprises a sensor module 130 configured to be coupled with a plurality of sensing elements of the fingerprint sensor (not shown). The sensor module 130 is further configured to acquire resulting signals from the plurality of sensing elements based at least in part on the adjusted sensing parameter. In one embodiment, the fingerprint controller 100 is configured to determine a fingerprint image based at least in part on the resulting signals. Each of these elements is described below in greater detail and in connection with selected embodiments.

In one embodiment, fingerprint controller 100 is configured to acquire fingerprint data with the fingerprint sensor. The fingerprint data may correspond to one or more fingerprint frames. A fingerprint frame may correspond to a period during which the fingerprint controller operates the fingerprint sensor to acquire resulting signals. In one embodiment, the fingerprint frames are used to form a fingerprint image. A fingerprint image comprises at least one fingerprint frame during which resulting signals are received with sensing elements by sensor module 130. The resulting signals may correspond to optical signals reflected by an input finger or capacitive sensing signals altered by an input finger.

In one embodiment, input 110 is coupled to one or more controllers through one or more wires (traces) and receives control signal 140 from one or more of these controllers. In various embodiments, any number of controllers may provide a corresponding control signal to fingerprint controller 100 via input 110. For example, a first and second controller may provide a corresponding control signal to fingerprint controller 100 at different times. In another embodiment, the control signal 140 may include potential interference information corresponding to two or more controllers. For example, a first controller may communicate a control signal, including potential interference information corresponding to the first controller and at least a second controller, to the fingerprint controller 100. The controllers may be a display controller (e.g., a display driver integrated circuit (DDIC)), a sensor controller, a host controller, or other suitable types of controllers. In one embodiment, fingerprint controller 100 includes multiple inputs, through which multiple controllers may be coupled to fingerprint controller 100. For example, input 110 may be coupled a host controller, display controller, and/or a sensor controller. In various embodiments, input 110 may also be referred to as a pin, a terminal, or a channel. In various embodiments, components other than controllers may be configured to communicate a control signal (e.g., control signal 140) to the fingerprint controller 100. For example, control circuitry may be configured to communicate the control signal 140.

The fingerprint controller 100 includes a processing system (not shown) which may include a CPU, memory, etc., for interfacing with a fingerprint sensor. The fingerprint sensor may include array of optical, capacitive, or ultrasonic sensing elements and capable to detect various fingerprint features, such as ridges and valleys, small features such as pores, etc.

Sensor module 130 may include circuitry configured to couple with sensing elements of the fingerprint sensor and receive resulting signals from the sensing elements. The fingerprint controller 100 may be integrated with the sensing elements in a single package, or the fingerprint controller 100 may be separate from and interface with the sensing elements. For example, sensing elements may be disposed on a substrate which is attached to or is a part of the fingerprint controller integrated circuit (IC). This configuration may be referred to as a fingerprint sensor package. The fingerprint sensor may extend over an entire region of a sensing area or a display area or a corresponding discrete portion thereof. Alternatively, the fingerprint sensor may be included in a distinct area as compared to the sensing area.

The sensor circuitry may be further configured to drive signals onto the sensor elements to receive the resulting signals. In one embodiment, the sensor circuitry may include analog circuitry configured to receive the resulting signals from the fingerprint sensor. For example, the sensor circuitry may include analog front ends (AFEs), analog-to-digital converters (ADCs), and the like.

Sensing parameter adjuster 120 may include any combination of hardware and software elements. For example, sensing parameter adjuster 120 may include circuitry, such as one or more amplifiers, switches, and/or multiplexers, configured to adjust one or more sensing parameters. Further, sensing parameter adjuster 120 may include software elements such as firmware stored within a memory and operable to adjust one or more sensing parameters. The sensing parameter may be any one or more of a resulting signals acquisition start time, resulting signals acquisition end time, resulting signals pause, sensing direction, length of image frame, and number of image frame.

In one embodiment, the sensor module 130 is coupled to a plurality of sensing elements and is configured to acquire resulting signals from the sensing elements based at least in part on one or more adjusted sensing parameters. Such sensing elements may be referred to as receiver elements. Sensor module 130 may receive resulting signals during fingerprint frames. In one embodiment, the fingerprint frames may be adjusted using the sensing parameter(s). For example, when a length of a fingerprint frame is increased, the period of time during which sensor module 130 receives resulting signals is increased. In other embodiments, sensing frequencies of the signals used for fingerprint sensing may be adjusted using the sensing parameter(s).

Sensor module 130 may include optical receiver circuitry or capacitive receiver circuitry. In one embodiment, sensor module 130 comprises one or more analog front ends (AFEs) configured to integrate a resulting signal during the fingerprint frame. Sensor module 130 may further include one or more switches, analog filters, digital filters, analog to digital converters (ADCs), and sample and hold circuits. In various embodiments, each sensing element may be coupled to a different AFE or at least two sensing elements may be coupled to a common AFE through at least one switch.

In one embodiment, fingerprint controller 100 is configured to determine a fingerprint image from the resulting signals. The resulting signals may be processed and combined to form a fingerprint image. The resulting signals may correspond to changes in capacitive coupling between fingerprint sensor electrodes or to an amount of light received with a light sensing element.

Fingerprint controller 100 may utilize any suitable combination of sensor components and sensing technologies to detect user input in the sensing region. Some implementations utilize arrays or other regular or irregular patterns of multiple sensing elements to detect the input. Exemplary sensing techniques may include capacitive sensing techniques, optical sensing techniques, acoustic (e.g., ultrasonic) sensing techniques, pressure based (e.g., piezoelectric) sensing techniques, resistive sensing techniques, thermal sensing techniques, inductive sensing techniques, elative sensing techniques, magnetic sensing techniques, and/or radar sensing techniques.

In one example, fingerprint controller 100 may use optical sensing techniques where one or more sensing elements detect light from the sensing region. The detected light may be reflected from an input object (e.g., a finger), transmitted through the input object, emitted by the input object, or some combination thereof. The detected light may be in the visible or invisible spectrum (such as infrared or ultraviolet light).

Figure 2A:
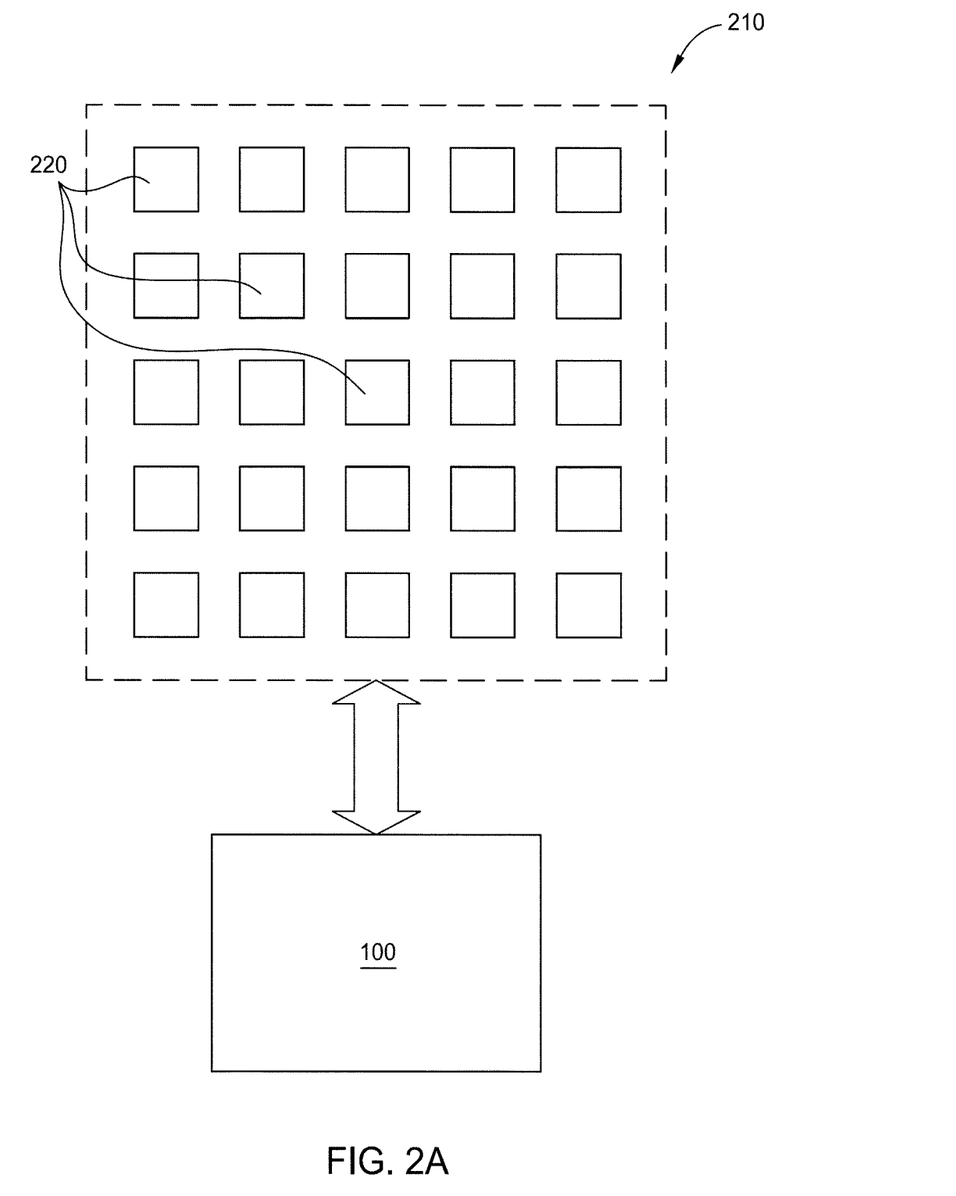
FIGS. 2A-2B illustrate fingerprint sensors according to one or more embodiments.

In the embodiment shown in FIG. 2A, fingerprint sensor 210 includes optical sensing element 220. Optical sensing elements 220 may be disposed in any orientation. In one embodiment, optical sensing elements 220 are disposed according to a blackmask, diodes, and/or other elements of a display device. Example optical sensing elements include CMOS image sensor arrays, charge-coupled device (CCD) arrays, photodiodes, and other suitable photosensors sensitive to light in wavelength(s) of interest. Active illumination may be used to provide light to the sensing region, and reflections from the sensing region in the illumination wavelength(s) may be detected to determine input information corresponding to the input object.

One exemplary optical technique utilizes direct illumination of the input object, which may or may not be in contact with an input surface of the sensing region depending on the configuration. One or more light sources and/or light guiding structures may be used to direct light to the sensing region. In one embodiment, the light source is an organic light emitting diode (OLED) display. When an input object is present, light from the light source may be reflected directly from surfaces of the input object, which reflections can be detected by optical sensing elements 220 and used to determine input information about the input object.

Another exemplary optical technique utilizes indirect illumination based on internal reflection to detect input objects in contact with an input surface of the sensing region. One or more light sources can be used to direct light in a transmitting medium at an angle at which it is internally reflected at the input surface of the sensing region, due to different refractive indices at opposing sides of the interface defined by the input surface. Contact of the input surface by the input object causes the refractive index to change across this boundary, which alters the internal reflection characteristics at the input surface. Higher contrast signals can be achieved by utilizing principles of frustrated total internal reflection (FTIR) to detect the input object, where the light is directed to the input surface at an angle of incidence at which it is totally internally reflected, except at locations where the input object is in contact and causes the light to partially transmit across this interface. An example of this is the presence of a finger introduced to an input surface defined by a glass (or other transparent material) to air interface. The higher refractive index of human skin compared to air causes light incident at the input surface at the critical angle of the interface to air to be partially transmitted through the finger, where it would otherwise be totally internally reflected at the glass to air interface. This optical response can be detected and used to determine spatial information. In some embodiments, this can be used to image small scale surface variations of the input object, such as fingerprint patterns, where the internal reflectivity of the incident light differs depending on whether a ridge or valley of the finger is in contact with that portion of the input surface.

Figure 2B:
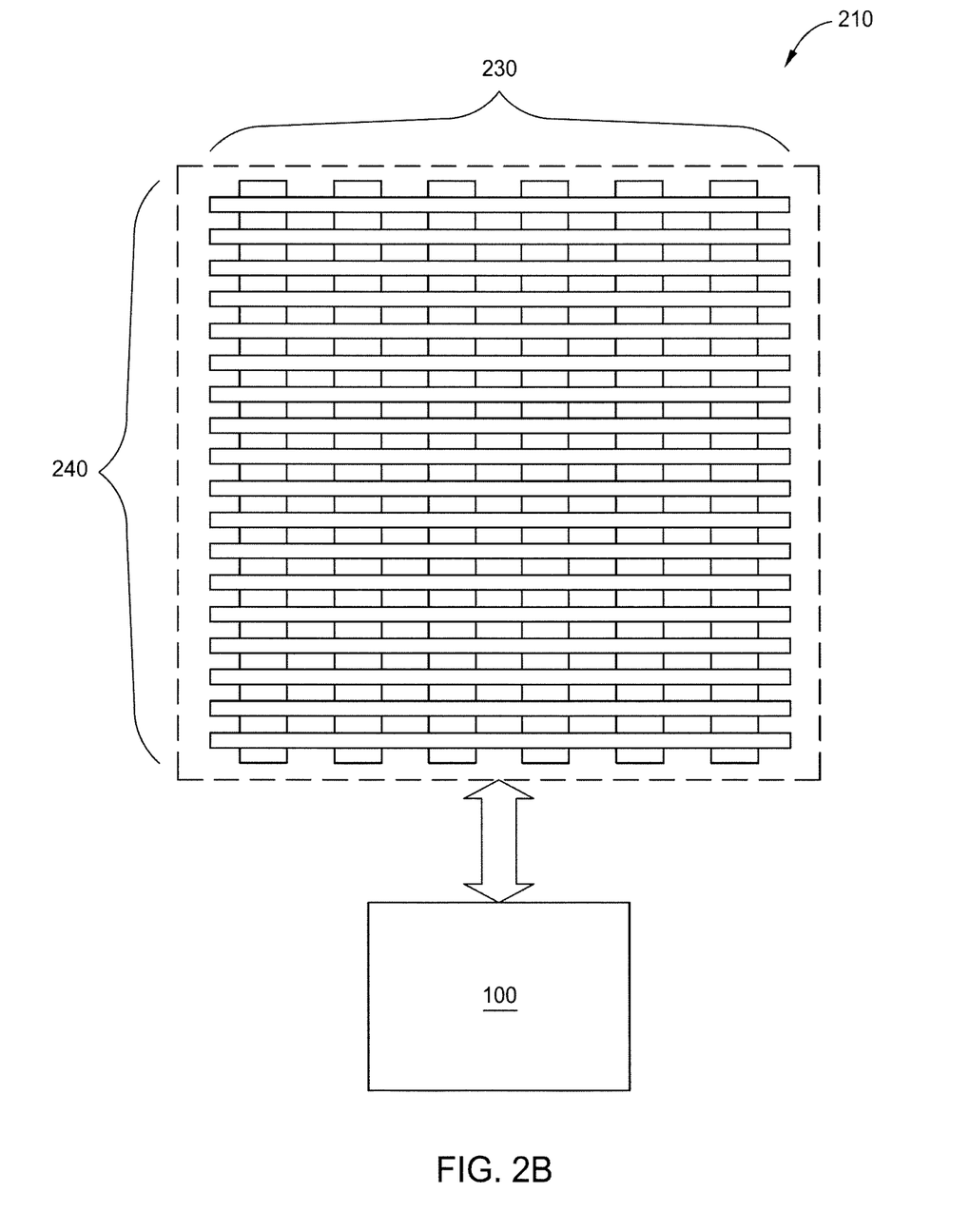

In various embodiments, fingerprint sensor 210 utilizes capacitive techniques where voltage or current is applied to create an electric field. In the embodiment of FIG. 2B, fingerprint sensor 210 includes fingerprint sensor electrodes 230, 240 and fingerprint controller 100. Nearby input objects cause changes in the electric field of the fingerprint sensor electrodes 230, 240, and produce detectable changes in capacitive coupling that may be detected as changes in voltage, current, or the like. In such an embodiment, fingerprint sensor electrodes 230, 240 may be utilized as capacitive sensing elements, and may be disposed in arrays or other regular or irregular patterns to create electric fields.

One exemplary technique utilizes "self capacitance" (or "absolute capacitance") sensing methods based on changes in the capacitive coupling between sensor electrodes (e.g., fingerprint sensor electrodes 230, 240) and an input object. An input object near the sensor electrodes alters the electric field near the sensor electrodes, thus changing the measured capacitive coupling. An absolute capacitance sensing method may operate by modulating sensor electrodes with respect to a reference voltage (e.g., system ground), and by detecting the capacitive coupling between the sensor electrodes and the input object. For example, the sensing electrodes may be modulated, or a drive ring or other conductive element that is ohmically or capacitively coupled to the input object may be modulated. Further, resulting signals received with the sensor electrodes may include effects corresponding to the modulated signals. The reference voltage may by a substantially constant voltage or a varying voltage, or the reference voltage may be system ground.

Another exemplary technique utilizes "mutual capacitance" (or "transcapacitance") sensing methods based on changes in the capacitive coupling between sensor electrodes (e.g., fingerprint sensor electrodes 230, 240). An input object near the sensor electrodes may alter the electric field between the sensor electrodes, thus changing the measured capacitive coupling. A transcapacitive sensing method may operate by detecting the capacitive coupling between one or more transmitter sensor electrodes (also "transmitter electrodes") and one or more receiver sensor electrodes (also "receiver electrodes").

Transmitter electrodes (e.g., fingerprint sensor electrodes 230, 240) may be modulated relative to a reference voltage to transmit transmitter signals. Receiver electrodes (e.g., fingerprint sensor electrodes 230, 240) may be held substantially constant relative to the reference voltage to facilitate receipt of resulting signals. The reference voltage may by a substantially constant voltage or system ground. The transmitter electrodes are modulated relative to the receiver electrodes to transmit transmitter signals and to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitter electrodes or receiver electrodes, or may be configured to both transmit and receive.

Also, sensor electrodes (e.g., fingerprint sensor electrodes 230, 240) may be dedicated transcapacitance sensor electrodes or absolute capacitance sensor electrodes, or may be operated as both transcapacitance and absolute capacitance sensor electrodes. In one embodiment, at least one sensor electrode may be modulated as a transmitter electrode in a transcapacitive sensing mode, while the sensor electrode also functions in an absolute capacitive sensing mode. Further, in a transcapacitive sensing mode, a receive electrode may be modulated, such that it functions as both a receive electrode for transcapacitive sensing and a sensor electrode for absolute capacitive sensing. In such an embodiment, the transmitter electrode is modulated with reference to the modulated receiver electrode. Further, a resulting signal received with a modulated receiver electrode may comprise effects corresponding to both a change in a transcapacitive coupling and an absolute capacitive sensing coupling.

Figure 3:
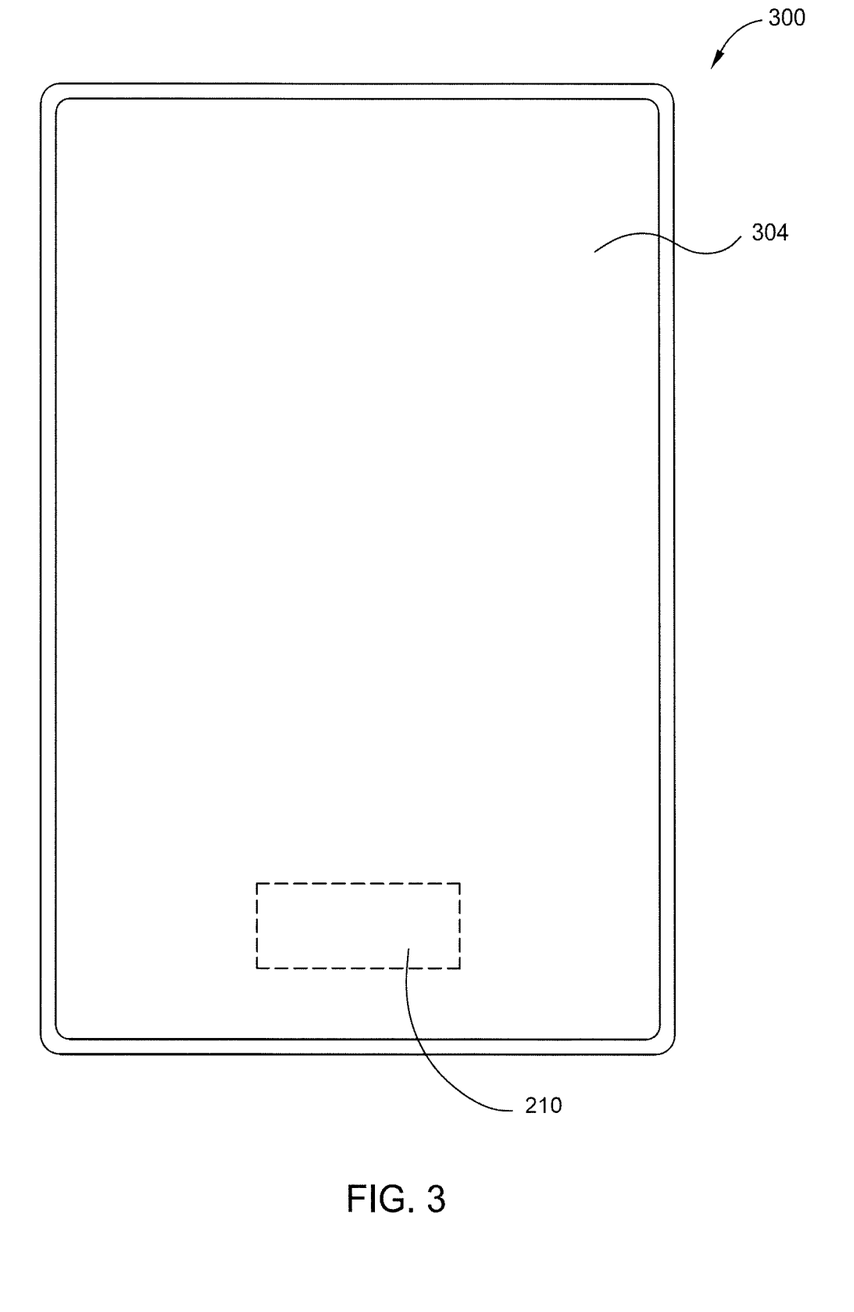
FIG. 3 illustrates a top view of an input device comprising a fingerprint sensor according to one or more embodiments.

FIG. 3 illustrates an input device 300, including a fingerprint sensor 210 and a display device 304. In various embodiments, the input device 300 further includes a touch sensing device (e.g., touch sensing device 308, FIG. 4). The touch sensing device 308 may be separate from display device 304 or integrated within display device 304, where the display device 304 and the touch sensing device 308 share at least one element. For example, a sensor electrode of the touch sensing device 308 may be comprised of display electrodes that are driven for updating a display device.

In one or more embodiments, the touch sensing device 308 may be a capacitive sensing device configured to detect one or more input objects proximate to and/or in contact with the input device 300. In such an embodiment, the touch sensing device 308 includes a plurality of capacitive sensor electrodes configured to detect changes in capacitance between capacitive sensor electrodes (e.g., transcapacitive sensing) and/or changes in capacitance between one or more sensor electrodes and an input device (absolute capacitive sensing). In one or more embodiment, the touch sensing device 308 may be additionally or alternatively configured to detect an amount of force applied by an input object. In other embodiments, the touch sensing device 308 may be an ultrasound sensing device, optical sensing device, or the like.

Figure 4:
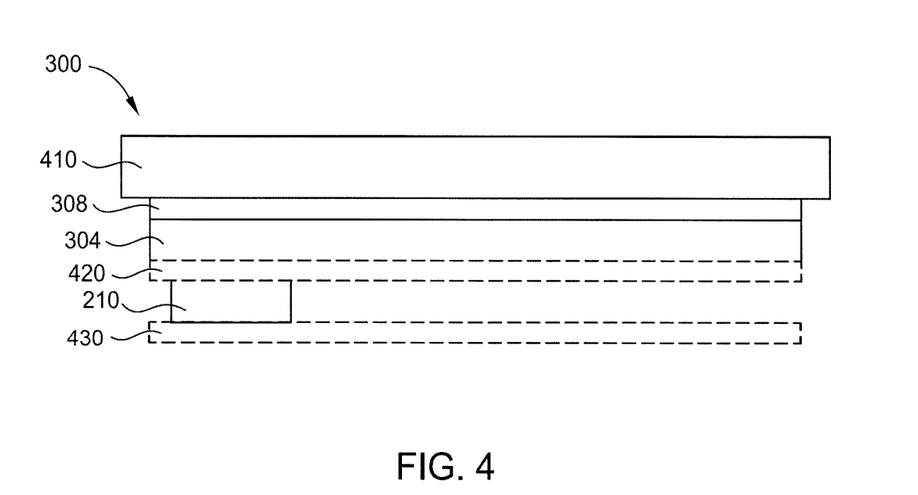
FIG. 4 illustrates another view of the input device comprising a fingerprint sensor according to one or more embodiments.

FIG. 4 illustrates a side view of input device 300 including a fingerprint sensor 210, display device 304 and lens 410 (e.g., input surface). As is illustrated, fingerprint sensor 210 is mounted below display device 304 such that the display device 304 is between the lens 410 and the sensing elements of fingerprint sensor 210. In one embodiment, fingerprint sensor 210 is mounted directly to the display device 304. In another embodiment, fingerprint sensor 210 is mounted to an optional substrate 420 which is attached to display device 304.

In various embodiments, fingerprint sensor 210 may be mounted to optional substrate 430 and optional substrate 420 may be excluded. In such embodiments, the fingerprint sensor 210 may be separated from display device 304 by an air gap or another material. In one embodiment, the material separating the fingerprint sensor 210 from display device 304 is any optically transparent material. Further, optional substrate 430 may be a portion of the housing of the input device 300 or a substrate mounted on the housing of the input device 300. Alternatively, optional substrate 430 may be any substrate within input device 300 between display device 304 and the housing of the input device 300, such that fingerprint sensor 210 is separated from display device 304. It will be understood that touch sensing device 308 may use multiple sensing technologies. As but one non-limiting example, touch sensing device 308 may use capacitive sensing (transcapacitive sensing and absolute capacitive sensing) to detect positioning, gestures, etc. of an input object.

In one embodiment, touch sensing device 308 comprises sensor electrodes configured to sense objects in a sensing region. Examples of input objects include fingers, styli, and hands. The sensing region encompasses any space above, around, in and/or near the sensor in which the input device 300 is able to detect user input (e.g., user input provided by one or more input objects). In some embodiments, touch sensing device 308 is configured to sense input that comprises no contact with any surfaces of the input device 300, contact with an input surface (e.g., lens 410) of the input device 300, contact with an input surface of the input device 300 coupled with some amount of applied force or pressure, and/or a combination thereof. In various embodiments, input surfaces may be provided by surfaces of sensor substrates within which or on which sensor elements are positioned, or by face sheets or other cover layers positioned over sensor elements.

In one embodiment, the fingerprint sensor 210, the display device 304, and the touch sensing device 308 are all discrete devices. In other embodiments, any combination of the fingerprint sensor 210, the display device 304, and the touch sensing device 308 are combined into a single device. In one embodiment, display device 304 may be an OLED display that may be used as the illumination source for fingerprint sensor 210. In such embodiments, fingerprint sensor 210 is an optical sensing device. In other embodiments, one or more elements of the fingerprint sensor 210 may be integrated within display device 304 and/or the touch sensing device 308. In one embodiment, the fingerprint sensor 210 is integrated with the touch sensing device 308, such that the fingerprint sensor shares one or more elements with the touch sensing device 308. It will be appreciated that fingerprint sensor 210 may be limited to only a subset of the area of the touch sensing device 308 as generally shown or may cover an area that is generally coextensive with the touch sensing device 308. In some embodiments, the fingerprint sensor 210 is integrated within the active area of the display device 304. The active area of the display device 304 may correspond to the portion of the display device 304 where images are displayed.

It will be understood that the same or different technologies can be used for position sensing and fingerprint sensing. For example, the touch sensing device and fingerprint sensor can both be capacitive or can both be optical sensing devices. Alternatively, the touch sensing device may be a capacitive sensing device while the fingerprint sensor is an optical sensing device or vice versa. Other types of sensing technologies can be used in various combinations.

Figure 5:
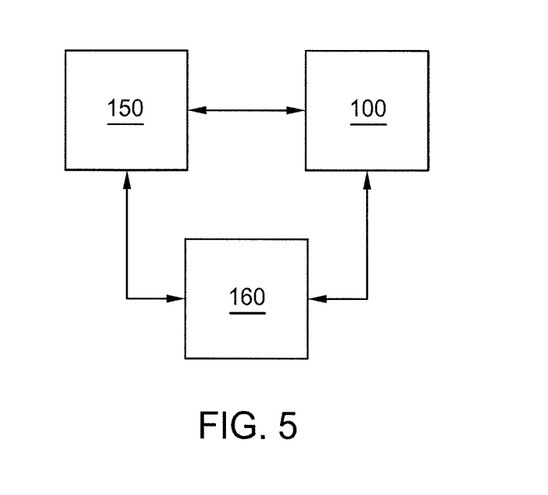
FIG. 5 illustrates communicatively coupled controllers according to one or more embodiments.

FIG. 5 illustrates a fingerprint controller 100 coupled with controller 150. In one embodiment, fingerprint controller 100 may be additionally coupled to controller 160. Although shown as separate components, fingerprint controller 100, controller 150, and/or controller 160, or portions thereof, may be combined within a single integrated circuit (IC) chip. In one embodiment, fingerprint controller 100, controller 150, and/or controller 160 each correspond to a different IC chip. In one embodiment, fingerprint controller 100 is coupled to controller 150 and/or controller 160 through input pin of fingerprint controller 100.

In one embodiment, controller 150 is a display controller and includes a processing system (display CPU, memory, etc.) for the display of the electronic device. An example of a display controller is a DDIC. The display controller connects to and drives the display of the electronic device, e.g., controls the display of graphics, text, and like which are visible to user on a display, such as an OLED or liquid crystal display (LCD) display. The display controller may also store preconfigured frames for displaying graphics to facilitate certain processes. For example, in certain embodiments, the display controller may illuminate a portion of the display corresponding to a fingerprint sensor 210 (e.g., create a finger placement guide) and/or may provide illumination of a finger for imaging using an optical fingerprint sensor. The display controller may also provide color indicative of match/no match when a fingerprint is captured.

In one embodiment, controller 160 is a sensor controller and includes a processing system (touch CPU, memory, etc.) for interfacing with a touch sensing device (e.g., touch sensing device 308). The sensor controller may, for example, be a touch application specific integrated circuit (ASIC). The sensor controller may include control circuitry and/or software and interfaces with the touch sensing device (e.g., array of touch sensing elements, which may be integrated with a display) to sense and process touches by an input object such as a stylus or finger. Any suitable technology may be used for the touch sensing device including capacitive sensing devices, optical input sensing, and the like as previously described.

The potential interference may be electrical interference and/or optical interference. In one embodiment, the potential interference is optical interference and control signal 140 is a display control signal. For example, the optical interference may correspond to a change in an amount of light emitted by the display device. In other embodiments, the potential interference is electrical interference and control signal 140 is a display control signal and/or a sensing control signal. For example, the electrical interference may correspond to signals emitted by nearby electronic devices. The electrical interference may correspond to wireless communication signals, interference from fluorescent lights, signals transmitted from touch sensing devices, electrical devices, etc. In other embodiments, the fingerprint controller 100 and portions of at least one of a display controller (e.g., controller 150) and a sensor controller (e.g., controller 160) are disposed on a common IC chip. In such embodiment, the electrical inference may correspond to the portions of the display controller and the sensor controller that are disposed on the same IC as the fingerprint controller 100.

In one embodiment, a display controller (e.g., controller 150) may be configured to provide display control signal or signals to fingerprint controller 100. The display control signal may be one of a horizontal sync signal, a vertical sync signal, data enable signal, pixel clock signal, and a brightness control signal.

The horizontal sync (HSYNC) signal may correspond to the start of a display line update period and/or to an end of a display line update period. In one embodiment, the horizontal sync signal may additionally or alternatively identify one or more blanking periods that correspond to a display line update period.

The vertical sync (VSYNC) signal may correspond to a start and/or an end of a display frame. In one embodiment, the VSYNC signal may additionally or alternatively identify one or more vertical blanking periods within a display frame.

The display enable signal may be a composite signal of both the HSYNC and VSYNC signal, and may identify the start time of a display frame, an end time of a display frame, horizontal blanking periods corresponding to a display line update period, and/or vertical blanking periods within a display frame.

The brightness control signal may correspond to the brightness level of the display. In one embodiment, the brightness control signal may provide an indication of an increase in brightness or a decrease in brightness. In one embodiment, the brightness control signal controls the amount of the light output by a backlight of a display device. In other embodiments, the brightness control signal controls the amount of light emitted by an OLED display. For example, the brightness control signal may control the amount of light emitted by each diode of an OLED display or adjusting the timing during which each diode is driven on or off.

In one embodiment, an OLED display is configured to adjust the brightness by increasing or decreasing the number of blacklines within a display frame. The blacklines may correspond to portions of the display that are not illuminated or portions of the display where the illumination is substantially reduced compared to other portions of the display, and by varying the number and configuration of the blacklines within display frames, a change in brightness is perceived by a human eye. In various embodiments, the blacklines correspond to one or more display lines of a display. Further, the blacklines may span one or more display lines and multiple blacklines may be grouped together to form groups that correspond to different areas of the display during each display frame. In one or more embodiments, the blacklines are applied to the display lines in a scanned fashion, such that during different portions of a display frame, different display lines are configured as blacklines.

The blacklines may be scanned in a sequential order or a non-sequential order. In one embodiment, pulse width modulation (PWM) is used to control the number of blacklines and the width of the combined blacklines to control the brightness of the display. Both the number of blacklines and the width of the combined blacklines may be varied individually to vary the brightness of the display. In one embodiment, the blacklines are sequentially scanned through a display frame such that a human eye will integrate the display frame into a brightness level.

Figure 6A:
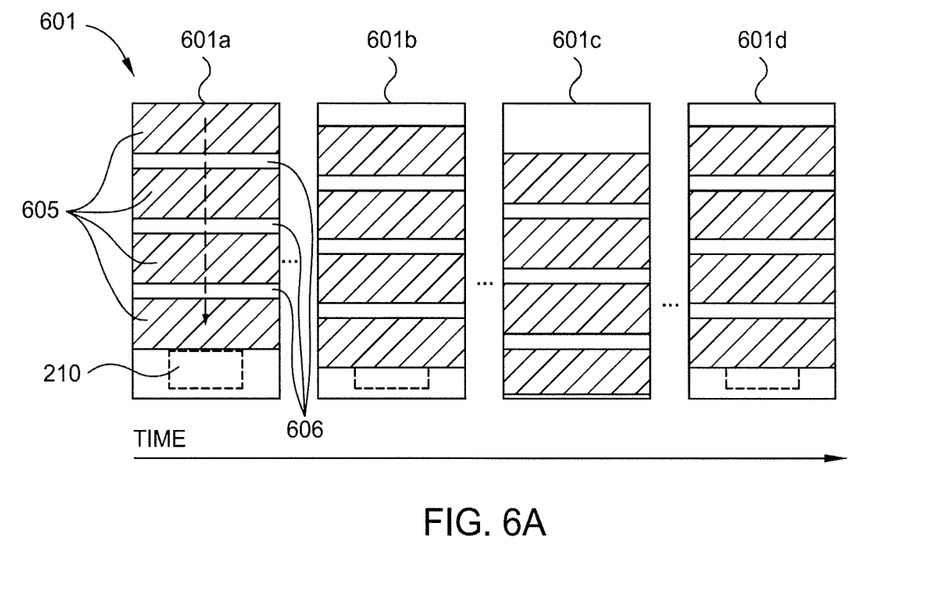
FIGS. 6A-6C illustrate display frames with varying brightness levels according to one or more embodiments.
Figure 6B:
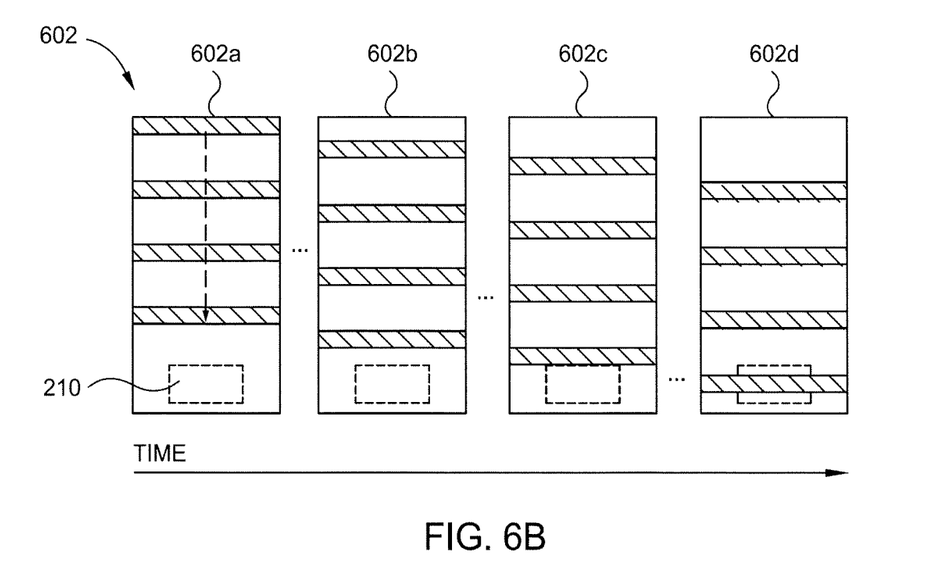
Figure 6C:
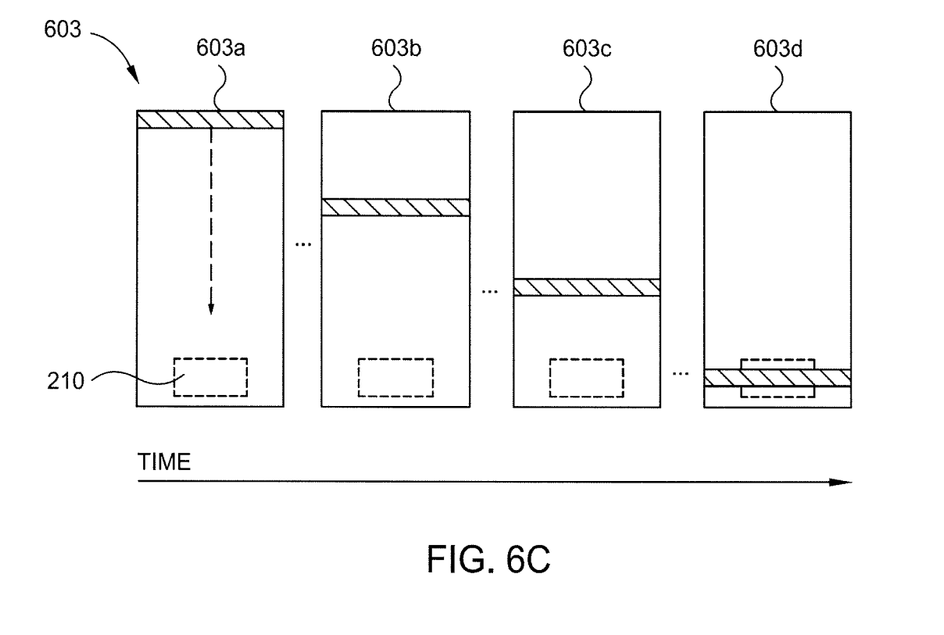

FIGS. 6A-6C illustrate different blackline configurations. FIG. 6A illustrates four subframes (e.g., subframe 601a-601d) of a display frame 601. During each subframe, a portion of the display is operated as blacklines 605, and a portion of the display emits light (e.g., light 606). As the display frame 601 progresses in time (e.g., moving from subframe 601a to 601d) the blacklines 605 are scanned through the display area, such that different portions of the display area correspond to blacklines and driven portions during each subframe.

Fingerprint sensor 210 may be disposed at a first portion of the display, and may be a discrete component disposed below the display device or integrated within the display device. In the first subframe 601a of display frame 601, no blacklines overlap fingerprint sensor 210. Thus, during subframe 601a, fingerprint sensor 210 is not substantially interfered with by a blackline, and experiences substantially no interference from the display device due to a change in illumination. Fingerprint sensor 210 may be configured to detect light that was emitted by a display device and deflected by a finger to detect ridges and valleys of a fingerprint. Thus, if the amount of light outputted by the display device changes while a fingerprint data is acquired, the fingerprint data may be erroneous and lead to a false or missed detection of a fingerprint. During subframes 601*b* and 601*d*, fingerprint sensor 210 is partially overlapped by blacklines, and during subframe 601*c* fingerprint sensor 210 is completely overlapped by blacklines. Thus, during subframes 601*b* and 601*d*, fingerprint sensor 210 is interfered with by a blackline and experiences interference due to a change in illumination. In one embodiment, a blackline that overlaps the fingerprint is over or near the optical fingerprint sensing area.

In one or more embodiments, adjusting a sensing parameter may include adjusting the timing used to capture fingerprint data to avoid subframes where the fingerprint sensor is at least partially overlapped by blacklines. For example, subframes 601*b*, 601*c* and 601*d* may be avoided and subframe 601*a* may be used to capture the fingerprint data. In other embodiments, only subframes where the blacklines completely overlap the fingerprint sensor may be avoided. In yet other embodiments, the timing used to capture a fingerprint data may be adjusted such that each portion of the fingerprint sensor is equally overlapped by blacklines with during a predetermined time period (e.g., one or more subframes or display frames). In one or more embodiments, the timing is adjusted such that the fingerprint data experiences a consistent brightness level while the fingerprint data is acquired.

FIG. 6B illustrates a display frame 602 comprising blacklines indicative of a brightness level different than that of display frame 601. For example, the blacklines correspond to a smaller portion of each display subframe as compared to those of display frame 601, thus display frame 602 corresponds to a higher brightness level than that of display frame 601. Further, as is illustrated in the embodiment of FIG. 6C, the blacklines of display frame 603 correspond to a smaller portion of the subframes as compared to those of display frame 601 and 602, thus the display frame 603 corresponds to a higher brightness level than that of display frames 601 and 602.

As compared to the display frame 601, both display frames 602 and 603 comprise more subframes where fingerprint sensor 210 are free from overlap with blacklines, thus the fingerprint sensor 210 experiences periods of higher brightness levels during display frames 602 and 603. For example, two subframes (subframes 602*c* and 602*d*) of display frame 602 have blacklines that interfere with fingerprint sensor 210 while two subframes (subframes 602*a* and 602*b*) of display frame 602 are free of blacklines that interfere with fingerprint sensor 210. Further, a single subframe (subframe 603*d*) of display frame 603 has blacklines that interfere with fingerprint sensor 210 while three subframes (subframes 603*a*, 603*b*, and 603*c*) of display frame 602 are free of blacklines that interfere with fingerprint sensor 210.

In such embodiments, the sensing rate of fingerprint sensor 210 during display frames 602 and 603 may be higher than that fingerprint sensor 210 during display frame 601. Further, as there are more subframes during which the fingerprint sensor 210 is not interfered with by blacklines during display frames 602 and 603, the number of subframes that may be used for fingerprint sensing may be increased. In one embodiment, the fingerprint sensing area of the fingerprint sensor is at a fixed location relative to the display. In other embodiments, the fingerprint sensing area is determined relative to the display based on a touch sensing device signal or one or more features of the display.

In one embodiment, the fingerprint controller 100 is configured to determine the position of blacklines based on control signal 140 provided by a display controller. For example, fingerprint controller 100 may receive a display brightness value signal that indicates the starting position and/or size of the blacklines. In another embodiment, the fingerprint controller 100 includes a counter having a value that is incremented with each pulse of the HSYNC signal. Further, the counter may be initiated by the VSYNC signal, and the fingerprint controller may be provided with a starting position of the blacklines and the number of display lines with the blacklines. Thus, as the value of the counter corresponds to the number of times the HSYNC single has been pulsed, the position of the blacklines may be determined based on the value of the counter, the number of blacklines and the starting position of the blacklines.

For example, in one embodiment, the starting position the blacklines corresponds to a first display line of a display device, and ten display lines are included within the blacklines. The value of the counter may be initialized (e.g., value of the counter is set to zero) based on the VSYNC signal and incremented based on the HSYNC signal. Hence, the value of the counter corresponds to the first display line of the blacklines. In one embodiment, fingerprint controller 100 may adjust a parameter based on the position of the blacklines. For example, for a fingerprint sensor located proximate display lines 80-100 of a display device, the fingerprint controller may determine when the blacklines are interfering (e.g., proximate and/or overlapping) with fingerprint sensor 210. Thus, fingerprint controller 100 may be configured to modify a sensing parameter to avoid potential interference from the blacklines. For example, fingerprint controller 100 may pause sensing (e.g., adjust the resulting signals pause parameter) by the fingerprint sensor or stop sensing by the fingerprint sensor. In another embodiment, fingerprint controller 100 may be configured to make alternative or additional adjustments. For example, fingerprint controller 100 may determine an end of fingerprint frame, pause capture of a fingerprint frame, and/or start a fingerprint frame based on a value of the counter.

In one or more embodiments, one or more buffer lines are used to stop or pause a fingerprint frame before the blacklines overlap the fingerprint sensor, and delay starting a new fingerprint frame or restarting the current fingerprint frame until after the blacklines have passed beyond the fingerprint sensor. For example, fingerprint controller 100 may pause the fingerprint frame before the counter reaches 80 and may restart the fingerprint frame after the counter reaches a number of lines after 100.

In one embodiment, the potential interference is electrical interference and control signal 140 is a display control signal and/or a sensor control signal. As is described above, the display control signal may be a horizontal sync signal, vertical sync signal, a display enable signal, a brightness control signal, or a combination thereof. In one or more embodiments, the brightness control signal maybe a pulse width modulation (PWM) signal. Further, the sensor control signal may be a sensing frequency signal, a status signal, an interference signal, a timing signal, or a combination thereof.

In one embodiment, the sensing frequency signal frequency may indicate various frequencies that may be utilized by the touch sensing device. In one embodiment, fingerprint controller 100 is configured to adjust a frequency of fingerprint sensing signal based on the sensing frequency signal. For example, fingerprint controller 100 selects a frequency of the fingerprint sensing signal that is different from the frequency of the sensing signal of capacitive sensing device. Further, fingerprint controller 100 selects a frequency of the fingerprint sensing signal that minimizes interference caused by the frequency of the sensing signal of touch sensing device.

In one embodiment, the interference signal may indicate one or more sensing signal frequencies known to be free from electrical interference and/or a measurement of interference at one or more sensing frequencies. Fingerprint controller 100 may utilize one of the frequencies known to be free from electrical interference as the frequency of the fingerprint sensing signal.

The status signal may indicate an operating mode of a touch sensing device. For example, the operating mode may be a low power mode, a sensing mode (absolute capacitive sensing mode or transcapacitive sensing mode), or a status mode. In one embodiment, fingerprint controller 100 adjusts a sensing parameter based on the status signal.

In one embodiment, the timing signal may indicate start and/or stop times of when the touch sensing device is driven and fingerprint controller 100 is configured to adjust at least one of a start time and a stop time of acquiring a fingerprint frame or a fingerprint subframe.

In one or more embodiments, sensing parameter adjuster 120 is configured to adjust at least one sensing parameter using control signal 140 to avoid potential interference. In one embodiment, the sensing parameters include at least one of timing, fingerprint sensing frequency, a length of a fingerprint frame of a fingerprint image, a number of fingerprint frames of a fingerprint image, and a sensing direction. In one embodiment, adjusting the fingerprint sensing frequency includes shifting from driving a first fingerprint sensing signal having a first frequency to a second fingerprint sensing signal having a second frequency different from the first. The second frequency may be higher than or lower than the first frequency. In other embodiments, adjusting the sensing direction parameter includes determining a scan direction of the fingerprint sensor electrodes by adjusting an order in which fingerprint sensor electrodes are driven and/or an order in which fingerprint sensor electrodes are operated to receive resulting signals.

In one or more embodiment, sensing parameter adjuster 120 is configured to adjust one or more of a resulting signals acquisition start time parameter, resulting signals acquisition end time parameter, and a resulting signals pause parameter. For example, at least one of a start time and an end time of a fingerprint frame may be adjusted by the sensing parameter adjuster 120. For example, the start and/or end time of a fingerprint frame may be adjusted by varying the time between fingerprint frames to at least one of adjust the resulting signals acquisition start time parameter, and resulting signals acquisition end time parameter. Further, the start time of a fingerprint frame may be delayed based at least in part on the potential interference such that the time between frames is increased. In one embodiment, the start and/or end time of a fingerprint frame may be adjusted such that each fingerprint frame experiences a constant brightness level. Additionally, one or more interrupt periods may be introduced within one or more fingerprint frames.

In one or more embodiments, sensing parameter adjuster 120 is configured to adjust a length of an image frame parameter by increasing or decreasing the length of at least one image frame based at least in part on the potential interference. For example, sensing parameter adjuster 120 may be configured to adjust a length of a fingerprint frame parameter by increasing or decreasing the length of at least one fingerprint frame based on the potential interference. Increasing the length of an image frame increases the period of time over which received resulting signals are integrated. In one embodiment, the length of a fingerprint frame may be increased or decreased such that each fingerprint frame experiences a similar brightness level.

In various embodiments, adjusting a number of fingerprint frames comprises increasing or decreasing the number of fingerprint frames in an image. For example, the number of fingerprint frames may be increased, such that more frames may be combined to form a fingerprint image, reducing the effects of the potential interference.

In one embodiment, sensing parameter adjuster 120 is configured to adjust the number of fingerprint frames within a fingerprint image based at least in part on a brightness level indicated by a brightness control signal. For example, sensing parameter adjuster 120 may increase the number of fingerprint frames within a fingerprint image when the brightness is below a threshold level and/or has been decreased. Further, sensing parameter adjuster 120 may decrease the number of fingerprint frames within a fingerprint image when the brightness is above a threshold level and/or has been increased. In one embodiment, the threshold level corresponds to an amount of illumination required to illuminate a finger during a fingerprint frame such that ridges and valleys of the fingerprint may be measured. The threshold level may be predetermined or determined during operation of the fingerprint sensor.

In various embodiments, sensing parameter adjuster 120 is configured to adjust the timing of each image frame within an image based at least in part on a brightness level indicated by a brightness control signal. For example, the timing of each fingerprint frame may be adjusted such that a blackline of the display does not occur during each fingerprint frame. Further, the start of each fingerprint frame may be adjusted to avoid blacklines. In one or more embodiments, the timing of each fingerprint frame may be adjusted such that an equal number of blacklines occur during each fingerprint frame. Further, the timing of each fingerprint frame may be adjusted such that blacklines occur at different points within each fingerprint frame of a fingerprint image. In yet other embodiments, the start and/or end time of a fingerprint frame may be adjusted such that the fingerprint frames are uniformly affected by blacklines.

Sensing parameter adjuster 120 may be configured to adjust the length of each image frame within an image based at least in part on a brightness level indicated by a brightness control signal. For example, the length of each fingerprint frame of a fingerprint image may be decreased such that it occurs between blacklines of a display frame or a subframe of a display frame, during which display lines overlapping the fingerprint sensor are driven. Further, the length of each fingerprint frame may be increased when the period between blacklines is increased, indicating an increased brightness.

In one or more embodiments, any combination of resulting signals acquisition start time, resulting signals acquisition end time, resulting signals pause, sensing direction, length of image frame, and number of image frames may be adjusted by sensing parameter adjuster 120. For example, when the length of the fingerprint frames is decreased, fingerprint frames are made shorter, and the number of fingerprint frames used to create a fingerprint image may be increased. Further, the timing of each fingerprint frame may be adjusted such that they occur between blacklines of a display frame or a subframe of a display frame.

Figure 7:
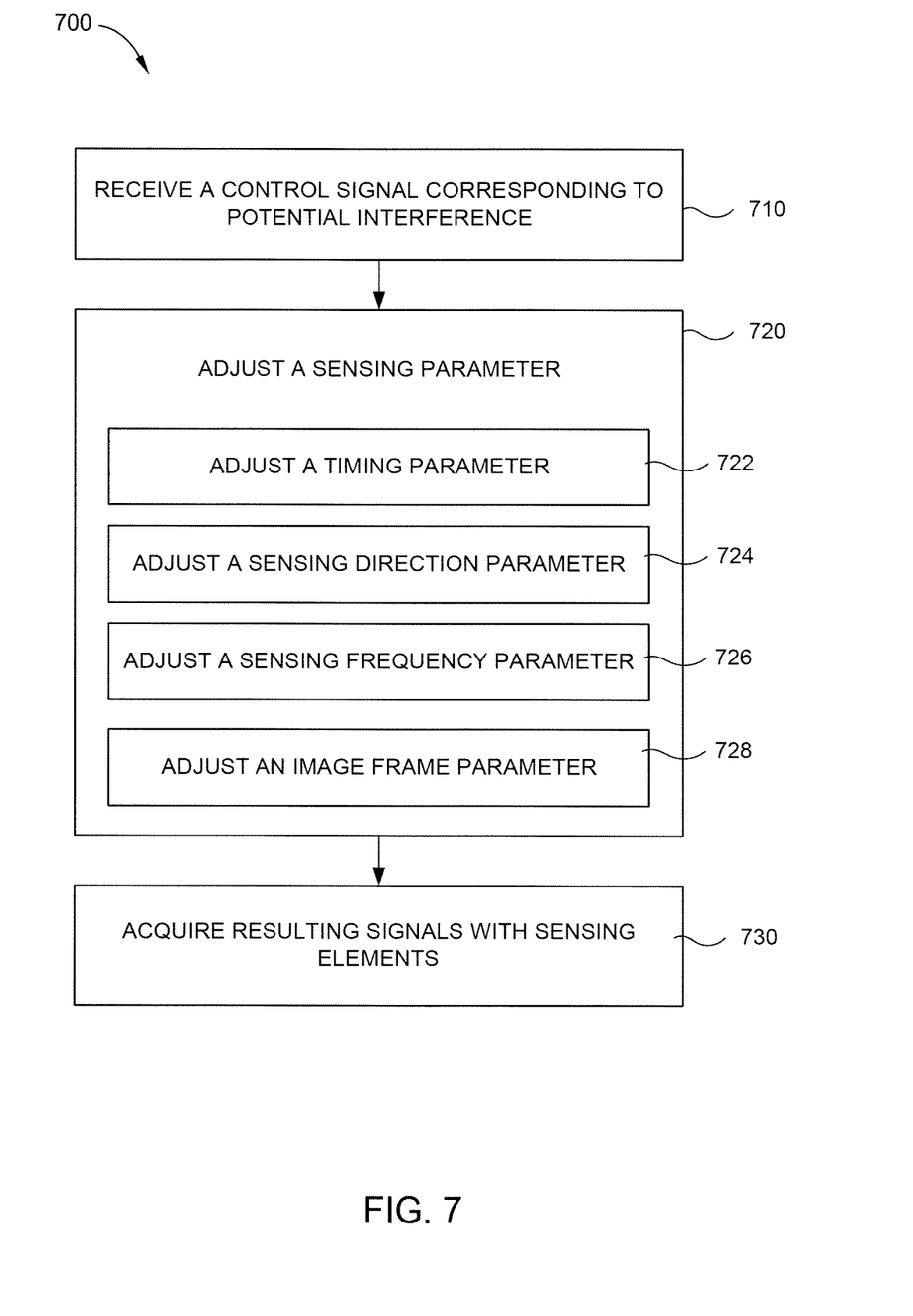
FIG. 7 illustrates a method for interference avoidance according to one or more embodiments.

FIG. 7 shows a flowchart 700 illustrating a method for mitigating interference in a fingerprint sensor. In one embodiment, mitigating interference includes at least partially reducing the effect of the interference of an image (e.g., or any other output of fingerprint controller 100) and/or resulting signals. For example, a length of an image frame and/or the number of image frames may be increased to reduce the effects of the interference on the resulting signals and/or the image. In such an example, the interference may still be present; however, the effects of the interference are reduced such that the resulting signals and/or image are not negatively affected. In one embodiment, the resulting signals and/or image may still be used to authenticate a user based on fingerprint data determined from the resulting signals.

In another embodiment, mitigating interference includes at least partially avoiding the interference in the resulting signals and/or the image. In embodiments where the interference is avoided, the interference may not be present in the resulting signals and/or image. For example, a timing parameter may be adjusted to avoid interference due to reduced brightness and/or a sensing frequency may be adjusted to avoid electrical interference affecting specific sensing frequencies.

In embodiments where the effects of interference persist after one or more of the mitigation techniques described herein have been applied, the fingerprint controller 100 may be configured to process the resulting signals and/or image to further reduce effects of the interference. For example, the fingerprint controller 100 may be configured to filter the resulting signals and/or image to further reduce the effects of interference. In various embodiments, the fingerprint controller 100 may be configured to combine multiple images and/or resulting signals when the effects of interference persist after one or more of the mitigation techniques described herein have been applied. For example, the fingerprint controller 100 may be configured to average two or more fingerprint images when the effects of interference persist after one or more of the mitigation techniques described herein have been applied.

At step 710, a control signal is received, where the control signal corresponds to potential interference. The control signal may be a display control signal and/or a sensor control signal. Further, the potential interference may be optical interference or electrical interference. In one embodiment, control signal 140 is received with input 110 of fingerprint controller 100.

At step 720, at least one sensing parameter of a fingerprint sensor is adjusted based at least in part on the control signal to avoid the potential interference. In various embodiments, adjusting at least one parameter comprises processing the information contained within the control signal, determining one or more parameters to be adjusted and/or how to adjust a parameter, and adjusting the parameter using the processed control signal.

In various embodiments, the control signal includes one or more of a horizontal sync signal, a vertical sync signal, a data enable signal, a pixel clock signal, and a brightness control signal of a display controller (e.g., controller 150). Further, the control signal may be one or more of a sensing frequency signal, a status signal, an interference signal, and a timing signal to a sensor controller (e.g., controller 160). The sensing parameters may include one or more of resulting signals acquisition start time, resulting signals acquisition end time, resulting signals pause, sensing direction, length of image frame, a number of image frames, and sensing frequency.

In one embodiment, at optional step 722, a timing parameter of fingerprint sensor 210 is adjusted. For example, the control signal 140 may be processed to adjust a resulting signal acquisition start time, a resulting signal acquisition end time, and/or a resulting signal pause. In one embodiment, a horizontal sync signal, a vertical sync signal, a data enable signal, and/or a pixel clock signal may be processed to determine at least one of a resulting signals acquisition start time, a resulting signals acquisition end time, and a resulting signals pause. In another embodiment, a brightness control signal may be processed to determine at least one of a resulting signals acquisition start time, a resulting signals acquisition end time, and a resulting signals pause. In various embodiments, one or more of the status signal, the interference signal, and the timing signal may be processed to determine one or more of resulting signals acquisition start time, resulting signals acquisition end time, and resulting signals pause.

At optional step 724, a sensing direction parameter is adjusted. For example, one or more of a horizontal sync signal, a vertical sync signal, a data enable signal, a pixel clock signal, a brightness control signal, a status signal, an interference signal, and a timing signal may be processed be sensor module 130 to adjust the sensing direction parameter. For example, the sensor module 130 may determine the direction to scan the sensing elements of the fingerprint sensor 220. In one embodiment, the control signal 140 may be processed to determine which portion of the fingerprint sensor 220 to scan first. For example, it may be determined to scan from a first edge to a second edge of the fingerprint sensor 220. In other embodiments, it may be determined to start scanning proximate the center of the fingerprint sensor 220 and scan toward first or second edge of the fingerprint sensor 220.

At optional step 726, a sensing frequency parameter is adjusted. For example, one or more of a sensing frequency signal, a status signal, and an interference signal may be processed to determine a sensing frequency of a sensing signal used for sensing. In one embodiment, sensing module 130 is configured to adjust from driving a first sensing element with a first sensing signal having a first sensing frequency to driving the first sensing element with a first sensing signal having a second sensing frequency different than the first sensing frequency. One or more of the sensing frequency signal, the status signal, and the interference signal may identify one or more sensing frequencies that are free from interference, and sensor module 130 may be configured to select a sensing frequency that is free of interference from the identified frequencies. Further, in one or more embodiments, the fingerprint controller 100 is configured to adjust the sensing frequency of the sensing signal when the sensing frequency signal identifies that interference exists at the current sensing frequency.

At optional step 728, an image frame parameter is adjusted. For example, the control signal 140 may be processed to determine a start time of a fingerprint frame, an end time a fingerprint frame, and/or a number of fingerprint frames within a fingerprint image. In one embodiment, one or more of the horizontal sync signal, the vertical sync signal, the data enable signal, the pixel clock signal, the brightness control signal, the status signal, interference signal, and the timing signal may be processed by sensor module 130 to adjust the image frame parameter. For example, at least one of a start time of a fingerprint frame, an end time a fingerprint frame, and/or a number of fingerprint frames within a fingerprint image may be determined. For example, the brightness control signal may be processed to determine the brightness level of an OLED display. In one embodiment, when the display brightness level is determined to have decreased, the number of fingerprint frames may be increased, and/or the length of the fingerprint frames may be increased.

At step 730, resulting signals are received with sensing elements. In one embodiment, the resulting signals are received by sensor module 130 with sensing elements of the fingerprint sensor 210. In one embodiment, the pluralities of sensing elements are optical sensing elements configured to receive resulting signals corresponding light reflected by an input object. The light may be provided by an OLED display or other light source. In other embodiments, the plurality of sensing elements is capacitive receiver electrodes configured to receive resulting signals corresponding to changes in capacitive coupling. The plurality of sensing elements may be operated as sensing electrodes in an absolute capacitive sensing mode and/or as receive electrodes in a transcapacitive sensing mode.

In one embodiment, the resulting signals may be processed to determine changes in capacitive coupling or an amount of light received, which may be used to determine a fingerprint image. In one embodiment, the changes in capacitive coupling or an amount of light received are utilized to determine one or more fingerprint frames, and the fingerprint frames are combined to generate a fingerprint image. For example, the fingerprint frames may be summed, averaged, or combined in any other way to form a fingerprint image.

In one embodiment, the fingerprint controller 100 sends a fingerprint image to the host for matching against an enrollment template. Enrollment templates may be generated by one or fingerprint images, and used to authenticate a user. Alternatively, if the fingerprint controller is equipped with fingerprint matching capabilities, the fingerprint controller may perform matching (e.g., comparison of the captured fingerprint against enrollment template) itself and, if necessary, wake the host after a successful fingerprint authentication. The fingerprint controller may combine one or more frames together to form a fingerprint image. For example, the frames may be summed, averaged, or combined in any other way to form an image.

In one embodiment, a background measurement is taken by the fingerprint sensor when no object is in a sensing region (i.e., touching or proximate to) of the fingerprint sensor. The background measurement changes with the environment and operating conditions, and may be estimated in various ways. In various embodiments, a background measurement may be referred to as a baseline measurement. In one embodiment, more than one background measurement may be acquired for a fingerprint sensor, where each background measurement is affected by a different amount and/or type of interference. For example, more than one background measurement may be acquired for an optical fingerprint sensor, where each background measurement corresponds to a different brightness level. Each background measurement may be stored as a baseline within a memory and used to adjust fingerprint images and/or frames acquired under similar brightness levels. In one embodiment, the background measurements are combined with corresponding fingerprint images or frames to remove the background measurements from each pixel of the image or frame.

While the above disclosure is directed toward fingerprint sensors, the details described above may be applied to biometric sensor, capacitive sensors, optical sensors, ultrasonic sensors, or any suitable type of sensors. For example, the control signal 140 may be processed using the above described details to adjust one or more sensing parameters of a biometric sensor, such as a face recognition sensors, hand geometry sensors, iris recognition sensors, and retina sensors. Further, in other embodiments, the control signal 140 may be processed using the above described details to adjust one or more sensing parameters of a capacitive sensing device. In yet other embodiments, the control signal 140 may be processed using the above described details to adjust one or more sensing parameters of an optical sensor or an ultrasonic sensor configured to determine the position of one or more input objects.

These and other advantages maybe realized in accordance with the specific embodiments described as well as other variations. It is to be understood that the above description is intended to be illustrative, and not restrictive. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" are used as the plain-English equivalents of the respective terms "comprising" and "wherein." Moreover, in the following claims, the terms "first," "second," and "third," etc. are used merely as labels, and are not intended to impose numerical requirements on their objects.

What is claimed is:

1. A sensor controller comprising:
   an input terminal configured to receive a control signal, the control signal corresponding to potential interference;
   a sensor module comprising circuitry configured to acquire resulting signals from a plurality of sensing elements during one or more image frames of an image based at least in part on a sensing parameter, the sensing parameter comprising at least one parameter selected from the group consisting of a resulting signals acquisition start time, a resulting signals acquisition end time, a resulting signals pause, a sensing direction, a length of one of the one or more image frames, and a number of the one or more image frames; and
   a sensing parameter adjuster comprising circuitry configured to adjust the sensing parameter based at least in part on the control signal to at least mitigate the potential interference.

2. The controller of claim 1, wherein the control signal is at least one signal selected from the group consisting a horizontal sync signal, a vertical sync signal, a data enable signal, and a brightness control signal.

3. The controller of claim 1, wherein the control signal is at least one signal selected from the group consisting of a sensing frequency signal, a status signal, an interference signal, and a timing signal.

4. The controller of claim 1, wherein the potential interference is at least one selected from the group consisting of electrical interference and optical interference.

5. The controller of claim 1, wherein adjusting the sensing parameter comprises at least one selected from the group consisting of adjusting the length of one of the one or more image frames and adjusting the number of the one or more image frames.

6. The controller of claim 1, wherein the sensing parameter further comprises a sensing frequency, and wherein adjusting the sensing parameter comprises adjusting from driving a first sensing element of the plurality of sensing elements with a first sensing signal having a first frequency to driving the first sensing element with a second sensing signal having a second frequency different from the first frequency.

7. The controller of claim 1, wherein at least mitigating the potential interference comprises at least partially minimizing effects of the potential interference on the resulting signals.

8. The controller of claim 1, wherein the plurality of sensing elements is at least one selected from the group consisting of optical sensing elements and capacitive sensor electrodes.

9. A method for avoiding potential interference in a sensor, the method comprising:
receiving, at an input terminal of the sensor, a control signal corresponding to the potential interference;
adjusting a sensing parameter of the sensor based at least in part on the control signal to at least mitigate the potential interference; and
acquiring resulting signals from a plurality of sensing elements during one or more image frames of an image based at least in part on the adjusted sensing parameter, the sensing parameter comprising at least one parameter selected from the group consisting of a resulting signals acquisition start time, a resulting signals acquisition end time, a resulting signals pause, a sensing direction, a length of one of the one or more image frames, and a number of the one or more image frames.

10. The method of claim 9, wherein the control signal is at least one signal selected from the group consisting a horizontal sync signal, a vertical sync signal, a data enable signal, and a brightness control signal.

11. The method of claim 9, wherein the control signal is at least one signal selected from the group consisting of a sensing frequency signal, a status signal, an interference signal, and a timing signal.

12. The method of claim 9, wherein the sensing parameter further comprises a sensing frequency, and wherein adjusting the sensing parameter further comprises adjusting from driving a first sensing element of the plurality of sensing elements with a first sensing signal having a first frequency to driving the first sensing element with a second sensing signal having a second frequency different from the first frequency.

13. The method of claim 9, wherein adjusting the sensing parameter comprises at least one selected from the group consisting of adjusting the length of one of the one or more image frames and adjusting the number of the one or more image frames.

14. An input device comprising:
one or more sensing elements; and
a sensor controller coupled to the one or more sensing elements, and comprising a first input terminal and a sensing parameter, the sensor controller configured to:
receive, at the first input terminal, a control signal corresponding to potential interference;
adjust the sensing parameter based at least in part on the control signal, the sensing parameter comprising at least one parameter selected from the group consisting of a resulting signals acquisition start time, a resulting signals acquisition end time, a resulting signals pause, a sensing direction, a length of one of one or more image frames, and a number of the one or more image frames; and
acquire resulting signals with the one or more sensing elements during the one or more image frames of an image.

15. The input device of claim 14 further comprising a display device, wherein the display device is between the one or more sensing elements and an input surface.

16. The input device of claim 14, wherein the one or more sensing elements are one of optical sensing elements and capacitive sensor electrodes.

17. The input device of claim 14, wherein adjusting the sensing parameter comprises at least one selected from the group consisting of adjusting the length of one of the one or more image frames and adjusting the number of the one or more image frames.

18. The sensor controller of claim 1, wherein a fingerprint image is determined from the resulting signals.

19. The method of claim 9, wherein a fingerprint image is determined from the resulting signals.

20. The input device of claim 14, wherein a fingerprint image is determined from the resulting signals.

* * * * *